United States Patent
Krick et al.

(10) Patent No.: US 9,242,796 B1
(45) Date of Patent: Jan. 26, 2016

(54) DYNAMIC TAPE STORAGE LIBRARY FOR DATA MANAGEMENT

(71) Applicant: International Business Machines Corporation, Armonk, NY (US)

(72) Inventors: Frank Krick, Ockenheim (DE); Thorsten Muehge, Budenheim (DE); Erik Rueger, Ockenheim (DE); Daniel P. Wendler, Schlangenbad (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/481,945

(22) Filed: Sep. 10, 2014

(51) Int. Cl.
  *G11B 5/02* (2006.01)
  *B65G 1/04* (2006.01)
  *B65G 1/10* (2006.01)

(52) U.S. Cl.
  CPC ............... *B65G 1/0492* (2013.01); *B65G 1/10* (2013.01)

(58) Field of Classification Search
  None
  See application file for complete search history.

(56) References Cited

U.S. PATENT DOCUMENTS

| | | | |
|---|---|---|---|
| 5,303,214 A | 4/1994 | Kulakowski et al. | |
| 5,395,199 A * | 3/1995 | Day et al. | 414/267 |
| 5,768,141 A | 6/1998 | Hanaoka et al. | |
| 5,872,751 A | 2/1999 | Utsumi et al. | |
| 6,535,790 B2 * | 3/2003 | Nakano et al. | 700/214 |
| 6,710,962 B1 | 3/2004 | Caverly et al. | |
| 7,039,924 B2 * | 5/2006 | Goodman et al. | 720/600 |
| 7,101,139 B1 * | 9/2006 | Benedict | 414/281 |
| 7,387,485 B2 | 6/2008 | Dickey et al. | |
| 7,551,392 B2 | 6/2009 | Schultz | |
| 7,693,757 B2 * | 4/2010 | Zimmerman | 705/28 |
| 7,721,029 B2 * | 5/2010 | Lantry et al. | 710/74 |
| 7,869,604 B2 * | 1/2011 | Goodman et al. | 380/277 |
| 7,889,455 B2 * | 2/2011 | Schultz | 360/92.1 |
| 8,085,493 B2 | 12/2011 | Bosley et al. | |
| 8,422,164 B2 | 4/2013 | Green et al. | |
| 8,626,335 B2 * | 1/2014 | Wurman et al. | 700/216 |
| 8,687,315 B2 * | 4/2014 | Acevedo et al. | 360/92.1 |
| 2014/0016227 A1 | 1/2014 | Morrison et al. | |

FOREIGN PATENT DOCUMENTS

| | | |
|---|---|---|
| EP | 1519375 B1 | 6/2008 |
| EP | 1260977 B1 | 10/2008 |
| EP | 1519372 B1 | 1/2009 |

OTHER PUBLICATIONS

Krick et al., "Dynamic Tape Storage Library for Data Management", U.S. Appl. No. 14/488,338, filed Sep. 17, 2014.
IBM Appendix P, list of IBM patents or patent applications treated as related, Sep. 15, 2014.
Coyne et al., "IBM System Storage Tape Library Guide for Open Systems", IBM Redbooks, International Technical Support Organization, Tenth Edition (Jun. 2013), pp. 1-464 © Copyright International Business Machines Corporation 2000, 2013.
Wall, Matthew, "Li-fi' via LED light bulb data speed breakthrough", BBC News, Technology, Oct. 28, 2013, BBC © 2014, <http://www.bbc.com/news/technology-24711935>.

(Continued)

*Primary Examiner* — K. Wong
(74) *Attorney, Agent, or Firm* — Alexa L. Ashworth

(57) ABSTRACT

Embodiments of the present invention provides systems for a tape library shelf. In one embodiment, a tape library shelf is disclosed including a chassis, which contains tape cartridge slots for storing one or more tape cartridges. The tape library shelf includes at least one tape drive module, a control unit, and a moving device coupled to the chassis. The moving device is operatively connected to the control unit to move the chassis according to instructions received from the control unit.

20 Claims, 6 Drawing Sheets

(56) References Cited

OTHER PUBLICATIONS

"IEEE 802.11", Wikipedia, the free encyclopedia, this page was last modified on Jun. 17, 2014, <http://en.wikipedia.org/wiki/IEEE_802.11>.

"Free-space optical communication", Wikipedia, the free encyclopedia, this page was last modified on Jun. 12, 2014, <http://en.wikipedia.org/wiki/Free-space_optical_communication>.

"High-Speed Internet From the Ceiling Lamp", Fraunhofer Heinrich Hertz Institute, © 2014 Fraunhofer Heinrich Hertz Institute, <http://www.hhi.fraunhofer.de/press-media/press/high-speed-internet-from-the-ceiling-lamp.html>.

"Room for the Future, Gemtrac Storage Systems", Fujifilm, © 2009 Fujifilm Recording Media U.S.A., Inc., <http://www.fujifilmusa.com/shared/bin/Gemtrac_SellSheet.pdf>.

* cited by examiner

DYNAMIC TAPE STORAGE LIBRARY FOR DATA MANAGEMENT

BACKGROUND OF THE INVENTION

The present invention relates generally to the field of data storage libraries, and more particularly to the management of data using a dynamic tape storage library infrastructure.

Tape cartridges are commonly used to store large amounts of data and are typically implemented with tape drives used for reading and writing the data to and from the tape cartridges. As the amount of data continues to grow at exponential rates, it is often more efficient to store large numbers of tape cartridges in storage libraries. The storage libraries generally include sets of storage slots for storing the tape cartridges, one or more tape drives, and a tape cartridge retrieval mechanism for finding the appropriate tape cartridges and inserting the cartridges into the tape drive. Many of the storage libraries also contain some form of an internal communication system, such as a network connection.

SUMMARY

According to one embodiment of the present invention, a tape library shelf is provided, the tape library shelf comprising: a chassis, the chassis having a plurality of tape cartridge slots for storing one or more tape cartridges; at least one tape drive module coupled to the chassis; a control unit; and at least one moving device coupled to the chassis, the at least one moving device being operatively connected to the control unit to move the chassis according to instructions received from the control unit.

DETAILED DESCRIPTION

As big data grows at an exponential rate, the number of tape cartridge archives needed to store the data continues to grow as well. This increase in data leads to an increase in the number of tape cartridges to search in order to find requested data, as well as an increase in the required floor space in tape storage libraries to house the tape cartridges. Embodiments of the present invention provide a method for increasing the efficiency of data management using a dynamic storage library, which contains moveable library shelves, a separate mobile tape drive vehicle, and a separate control unit, which manages the library shelves, tape drive vehicle, and communications with external hosts.

Figure 1:
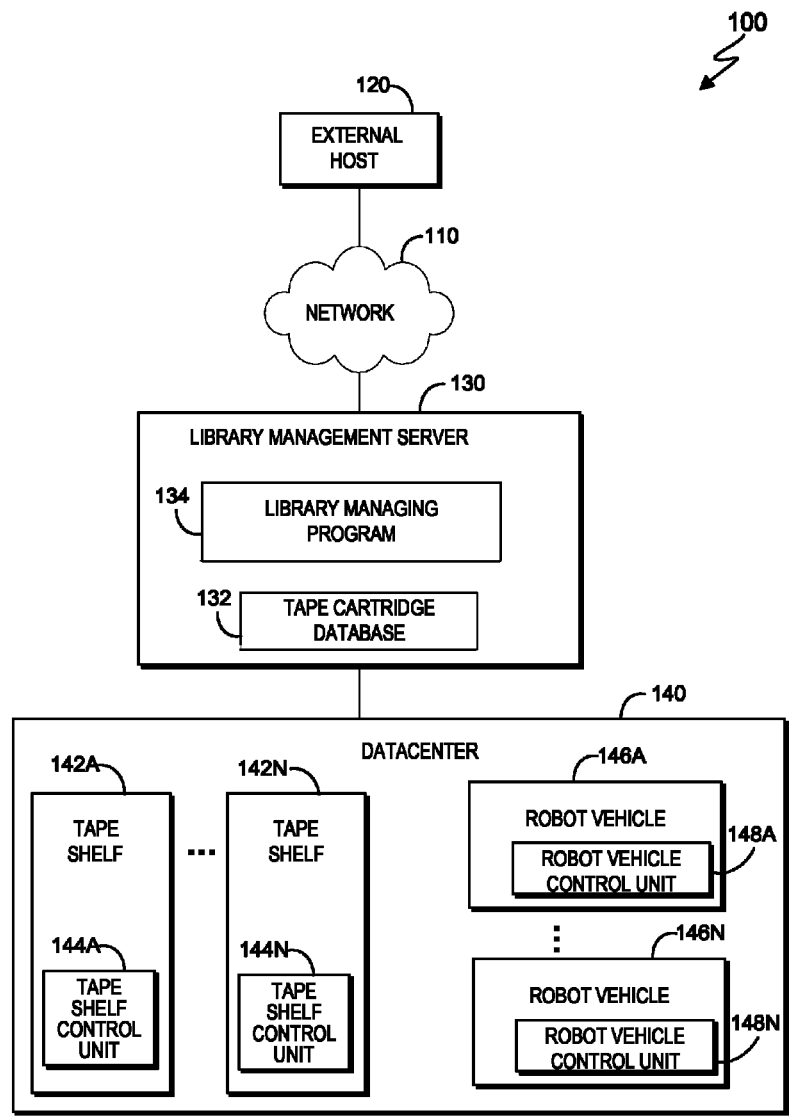
FIG. 1 is a functional block diagram illustrating an environment, in accordance with an embodiment of the present invention.

The present invention will now be described in detail with reference to the Figures. FIG. 1 is a functional block diagram illustrating an environment, generally designated 100, in accordance with one embodiment of the present invention. Modifications to environment 100 may be made by those skilled in the art without departing from the scope of the invention as recited by the claims. In an exemplary embodiment, environment 100 includes datacenter 140 in communication with library management server 130, and external host 120 connected to library management server 130 over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communication between external host 120 and library management server 130.

External host 120 may be a computing device, such as a laptop computer, a tablet computer, a netbook computer, a personal computer (PC), a desktop computer, a personal digital assistant (PDA), a smart phone, a thin client, or any programmable electronic device capable of communicating with library management server 130 via network 110. In other embodiments, external host 120 may be a management server, a web server, or any other electronic device or computing system capable of receiving and sending data. External host 120 may include internal and external hardware components, as depicted and described in further detail with respect to FIG. 7.

Datacenter 140 includes tape shelves 142A through 142N (142A-N) and robot vehicles 146A through 146N (146A-N). Any number of tape shelves 142A-N and any number of robot vehicles 146A-N may be added to, or removed from, datacenter 140 as required to support the management of tape cartridge data. For example, when five (5) additional tape shelves 142A-N are added to datacenter 140, two (2) additional robot vehicles 146A-N may be added to datacenter 140 to support the increase in tape cartridge data. Datacenter 140 is a tape library storage center and is capable of communicating data to and from external host 120, via library management server 130.

In this exemplary embodiment, tape shelves 142A-N contain tape cartridge slots to hold tape cartridges. Tape shelves 142A-N are capable of moving in two directions. In this exemplary embodiment, each of tape shelves 142A-N are capable of moving tightly, close together to reduce overall occupied floor space, and are capable of moving apart in order to allow access to requested tape cartridges. In this exemplary embodiment, tape shelves 142A-N contain tape drive modules (discussed in further detail below) to read and send data to a requesting external host via library management server 130. In this exemplary embodiment, tape shelves 142A-N are each capable of supporting multiple different data storage technologies. For example, magnetic tape cartridges, optical discs, electronic cartridge storage, and solid state drives (SSD), among other data storage technologies, may be stored on the same tape shelf. In other embodiments, each of tape shelves 142A-N contain one type of data storage technology. In this exemplary embodiment, tape shelves 142A-N are capable of being adapted to use with new data storage technologies.

In this exemplary embodiment, each of tape shelves 142A-N includes tape shelf control units 144A through 144N (144A-N), respectively. Tape shelf control units 144A-N communicate with library management server 130 and control the movement of each of tape shelves 142A-N. In this exemplary embodiment, tape shelf control units 144A-N are capable of controlling the movement of tape shelves 142A-N in a block unit in which one or more tape shelf control units 144A-N coordinate the movement of one or more of tape shelves 142A-N to generate one or more alleys. In some embodiments, tape shelf control units 144A-N also control the inventory of the tape cartridges contained on respective tape shelves 142A-N. In other embodiments, tape shelf control units 144A-N may also control a cartridge access mechanism, such as a front-mounted X, Y accessor.

In this exemplary embodiment, robot vehicles 146A-N are capable of movement in the x- and y-coordinate directions and capable of transporting tape cartridges to a secure tape cartridge slot within datacenter 140. Robot vehicles 146A-N open and close tape shelves 142A-N, grip tape cartridges, and place the tape cartridges into tape drives. Robot vehicles 146A-N perform troubleshooting tasks. In this exemplary embodiment, robot vehicles 146A-N are capable of plugging connectors, replacing parts, visually inspecting a technical system status, and operating a keyboard for the purpose of troubleshooting.

In this exemplary embodiment, robot vehicles 146A-N each include a respective robot vehicle control unit 148A through 148N (148A-N). Robot vehicle control units 148A-N receive a data request from an external host via library management server 130, and send tape data to the requesting external host via library management server 130. Robot vehicle control units 148A-N control the movement of each of robot vehicles 146A-N. In this exemplary embodiment, robot vehicle control units 148A-N are capable of locating tape cartridges within tape shelves 142A-N, instructing robot vehicles 146A-N to place the tape cartridge into a tape drive, and reading tape cartridge data from the tape drive.

Library management server 130 includes tape cartridge database 132 and library managing program 134. Library management server 130 may be a management server, a web server, or any other electronic device or computing system capable of receiving and sending data. In other embodiments of the present invention, library management server 130 can represent a computing system utilizing clustered computers and components to act as a single pool of seamless resources when accessed through a network. In this exemplary embodiment, library management server 130 is capable of receiving requests for data from external host 120, via network 110. Library management server 130 may include internal and external hardware components, as depicted and described in further detail with respect to FIG. 7.

Tape cartridge database 132 is a central storage for a set of tape cartridge data. In this exemplary embodiment, tape cartridge database 132 contains the location and access information for each tape cartridge located in datacenter 140. For example, tape cartridge database 132 may contain tape cartridge codes (e.g., tape barcodes), library shelf numbers, tape cartridge positions within each library shelf, the technology of each tape cartridge (i.e., magnetic tape or optical discs), and the time of access of each tape cartridge, among other information. In this exemplary embodiment, tape cartridge database 132 receives updated tape cartridge location information from tape shelf control units 144A-N and robot vehicle control units 148A-N, and may be accessed by tape shelf control units 144A-N and/or robot vehicle control units 148A-N.

In this exemplary embodiment, library managing program 134 processes requests for data from external host 120. Library managing program 134 is capable of optimizing, and communicating with, the various components within datacenter 140. In this exemplary embodiment, library managing program 134 is capable of accessing tape cartridge database 132 to determine a location of the requested data on tape shelves 142A-N. Library managing program 134 is capable of communicating with tape shelf control units 144A-N and sending movement requests to tape shelves 142A-N. In this exemplary embodiment, library managing program 134 stores the position and status of each of robot vehicles 146A-N, such as battery status of each vehicle, defects of each vehicle, and which vehicle tape drives are in use. Library managing program 134 is capable of determining one or more of robot vehicles 146A-N to retrieve and read the requested tape cartridge data. Library managing program 134 is capable of communicating with robot vehicle control units 148A-N to send tape cartridge retrieval requests, movement requests, and tape data read/write requests. Library managing program 134 is capable of receiving tape data from robot vehicle control units 148A-N and/or tape shelf control units 144A-N, and sending the requested data to external host 120.

Figure 2:
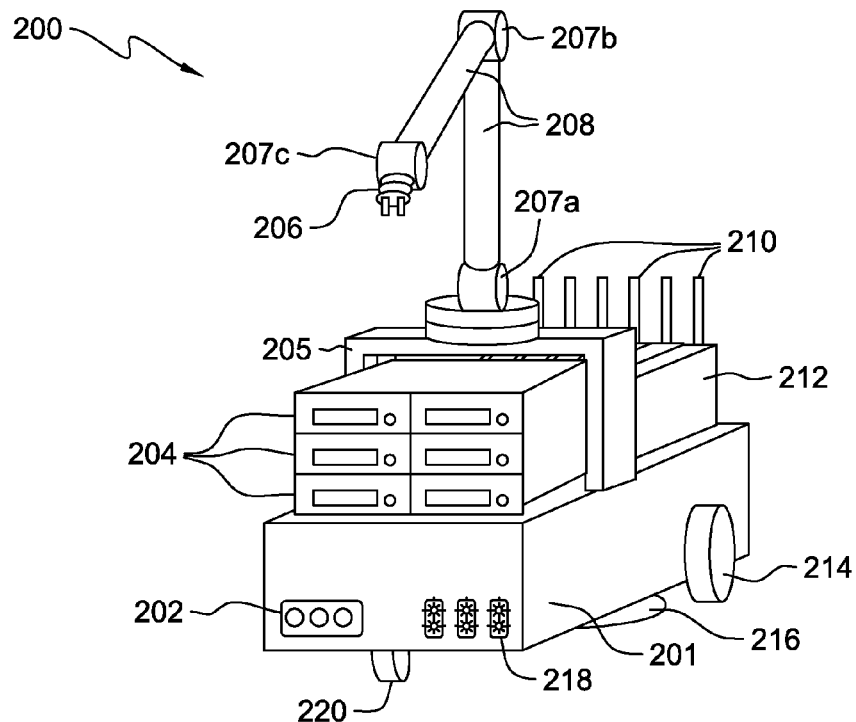
FIG. 2 depicts a block diagram of external components of a robot vehicle, in accordance with an embodiment of the present invention.

FIG. 2 depicts a block diagram of external components of robot vehicle 200, in accordance with an embodiment of the present invention. Robot vehicles 146A-N may each be implemented with robot vehicle 200.

In this exemplary embodiment, robot vehicle 200 is an autonomous robot vehicle. Robot vehicle 200 includes two moving devices 214, which are located on two opposing sides (only one side shown in FIG. 2) of chassis 201, and one direction device 220, which is located under the front center of chassis 201. Moving devices 214 and direction device 220 direct and move robot vehicle 200 in a datacenter. In this exemplary embodiment, moving devices 214 and direction device 220 are wheel devices connected to a power source (e.g., a battery) and contain a navigation sensor, which provides position data and distance traveled feedback to a control unit of robot vehicle 200. In other embodiments, any number of moving devices 214 and any number of direction devices 220 may be placed in any location on chassis 201, which allows movement of robot vehicle 200 in a datacenter. In this exemplary embodiment, moving devices 214 and direction device 220 are capable of rotating clockwise and counterclockwise around a horizontal axis, and direction device 220 is capable of rotating 360 degrees around a vertical axis. In other embodiments, one or more of moving devices 214 and direction device 220 may rotate in one or more directions around a horizontal axis, and may rotate up to 360 degrees around a vertical axis.

Robot vehicle 200 includes robot arm 208, mounted to chassis 201 by mount 205 and connected to gripper assembly 206 by pivot assembly 207c. In this exemplary embodiment, robot arm 208 is mounted to the top of chassis 201 by mount 205 and is able to move in two directions across mount 205, as well as rotate 360 degrees around the vertical axis at the mount point. In other embodiments, robot arm 208 is mounted to the front of chassis 201. In this exemplary embodiment, robot arm 208 has three pivoting joints: pivot mount 207a, pivoting joint 207b, and pivot assembly 207c, which support movement of robot arm 208 in multiple directions. For example, pivot mount 207a is mounted to chassis 201 and can rotate 360 degrees around the vertical axis, as well as 180 degrees around the horizontal axis. In this exemplary embodiment, robot arm 208 includes one pivoting joint 207b, which can rotate around a horizontal axis. Pivot assembly 207c is a mounting platform connecting gripper assembly 206 to robot arm 208, and can rotate 180 degrees around the vertical axis. In other embodiments, robot arm 208 may include one or more of pivoting joint 207b which supports movement of robot arm 208, each pivoting joint 207b rotating up to 360 degrees in one or more axes. In this exemplary embodiment, gripper assembly 206 is an electromechanical gripper device capable of identifying, retrieving, and moving a tape cartridge. In other embodiments, gripper assembly 206 may include one or more of: a camera; a barcode scanner; a radio frequency identification (RFID) reader for identifying the requested tape cartridges; one or more grippers; and a navigation sensor to locate positions within the tape library, mounted to one of the grippers. In this exemplary embodiment, gripper assembly 206 contains a barcode scanner (not shown in FIG. 2), and two grippers, which are designed to pick up and place tape cartridges and to work with varying tape cartridge technologies. In other embodiments, gripper assembly 206 may be any rapid exchange gripper mechanism technology which supports the retrieval and movement of tape cartridges, or other tasks in a datacenter, for example, plugging connectors and operating a keyboard for the purpose of troubleshooting. In this exemplary embodiment, robot arm 208 and/or gripper assembly 206 also contain a navigation sensor (not shown in FIG. 2), which provides position data feedback to the control unit of robot vehicle 200.

In this exemplary embodiment, tape drive modules 204 are connected to mini computers 212 via power connector 202, wireless network connections 210, or optical communication channels 218. Tape drive modules 204 may include one or more tape drives mounted to chassis 201. In this exemplary embodiment, tape drive modules 204 are capable of performing a read/write of data to or from a requesting host. In some embodiments, tape drive modules 204 are capable of sending data from one tape cartridge to multiple different requesting hosts, when directly connected to mini computers 212 as a host. In this exemplary embodiment, mini computers 212 are capable of bundling multiple wireless communication links and capable of managing data transmission bandwidth. In other embodiments, robot vehicle 200 may include one or more stand-alone mini computers 212, in communication with tape drive modules 204, via a wired or wireless connection. In this exemplary embodiment, robot vehicle 200 includes power connector 202 (detailed further below) which is a wired option for connecting tape drive modules 204 to mini computers 212, optical communication channels 218 (detailed further below) and wireless network communications 210 (detailed further below), which are both wireless options for connecting tape drive modules 204 to mini computers 212. In other embodiments, robot vehicle 200 may include one or more options (wired and/or wireless) for establishing a connection between tape drive modules 204 and mini computers 212.

Robot vehicle 200 includes voice coil 216 to charge the vehicle while driving on a charging coils track in a datacenter. Voice coil 216 allows robot vehicle 200 to recharge the capacity of the battery power source (not shown in FIG. 2) while continuously operating (i.e., no time-out period to recharge the vehicle).

Figure 3:
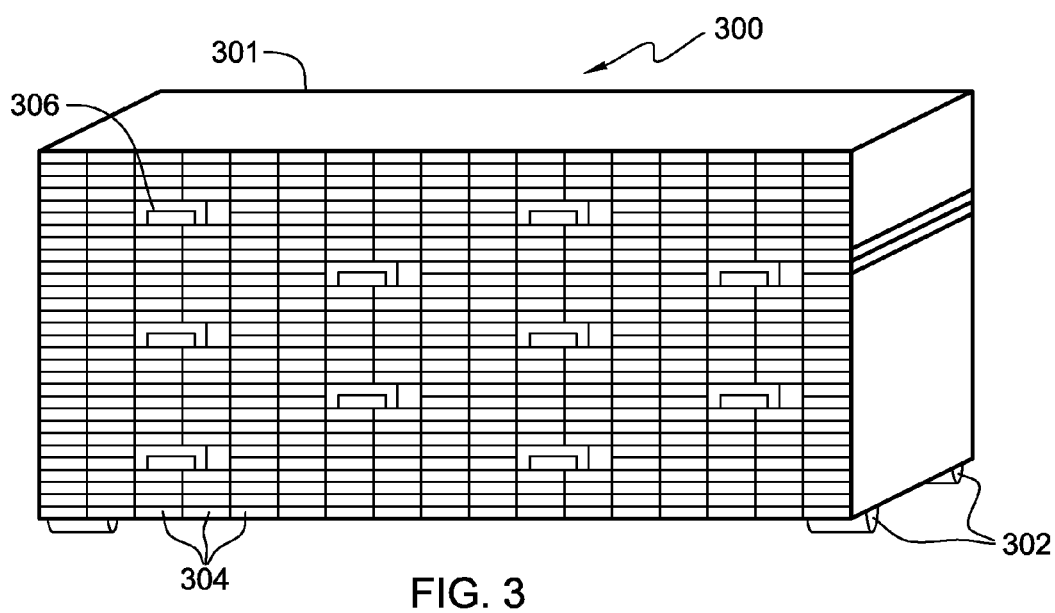
FIG. 3 depicts a block diagram of external components of a tape shelf module, in accordance with an embodiment of the present invention.

FIG. 3 depicts a block diagram of external components of a tape shelf module, such as tape shelves 142A-N, in accordance with an embodiment of the present invention. Tape shelf module 300 may be any tape shelf library technology, such as IBM T3500 libraries. In this exemplary embodiment, tape shelf module 300 is capable of supporting different tape cartridge technologies. Tape shelf module 300 contains chassis 301, moving device 302, tape cartridge slots 304, and tape drive module 306. In this exemplary embodiment, moving device 302 is electric rollers controlled by tape shelf control units 144A-N, and the electric rollers are located on the bottom at each of the four corners (only three corners visible in FIG. 3) of chassis 301. Moving device 302 supports movement of chassis 301 in two directions. In other embodiments, moving device 302 may be any number of wheels or rollers, may be connected with one or more axles, may use a motor, and may be located in any location which supports movement of chassis 301 in any number of directions. Tape cartridge slots 304 are spaces within chassis 301 for storing each tape cartridge. In this exemplary embodiment, tape cartridge slots 304 support many types of tape cartridges and/or data storage technology and may be adapted to support new tape cartridge and data storage technologies. Tape drive module 306 is one or more tape drives located within chassis 301. In this exemplary embodiment, each tape drive module 306 contains a computer module and wireless communication (not show in FIG. 3) to send tape data to a requesting host, in which the data may be accessed via an internal file system of the computer module, or read directly from the tape cartridge. Each tape drive module 306 manages an individual wireless communication link. Tape drives which become defective are capable of being ejected by chassis 301 or tape drive module 306. In other embodiments, the front of chassis 301 is covered, and only a front-mounted X, Y accessor and tape drive module 306 is capable of accessing and reading the tape cartridges. The front-mounted X, Y accessor is removably attached to chassis 301, for example, by plugging into the four cartridge slots at each of the four corners of chassis 301. A cover is secured over the X, Y accessor, using any fastening device, for example, bolts, when the X, Y accessor is in use. The cover may be composed of any material which provides security to the movable X, Y accessor and is compatible with tape shelf module 300, for example, heavy steel. In this exemplary embodiment, chassis 301 does not contain a front-mounted X, Y accessor, increasing the space within chassis 301 for tape cartridges, and the front of chassis 301 is exposed (i.e., does not have a cover) in order for a separate robot vehicle to access and read the tape cartridges from the tape shelf.

Figure 4:
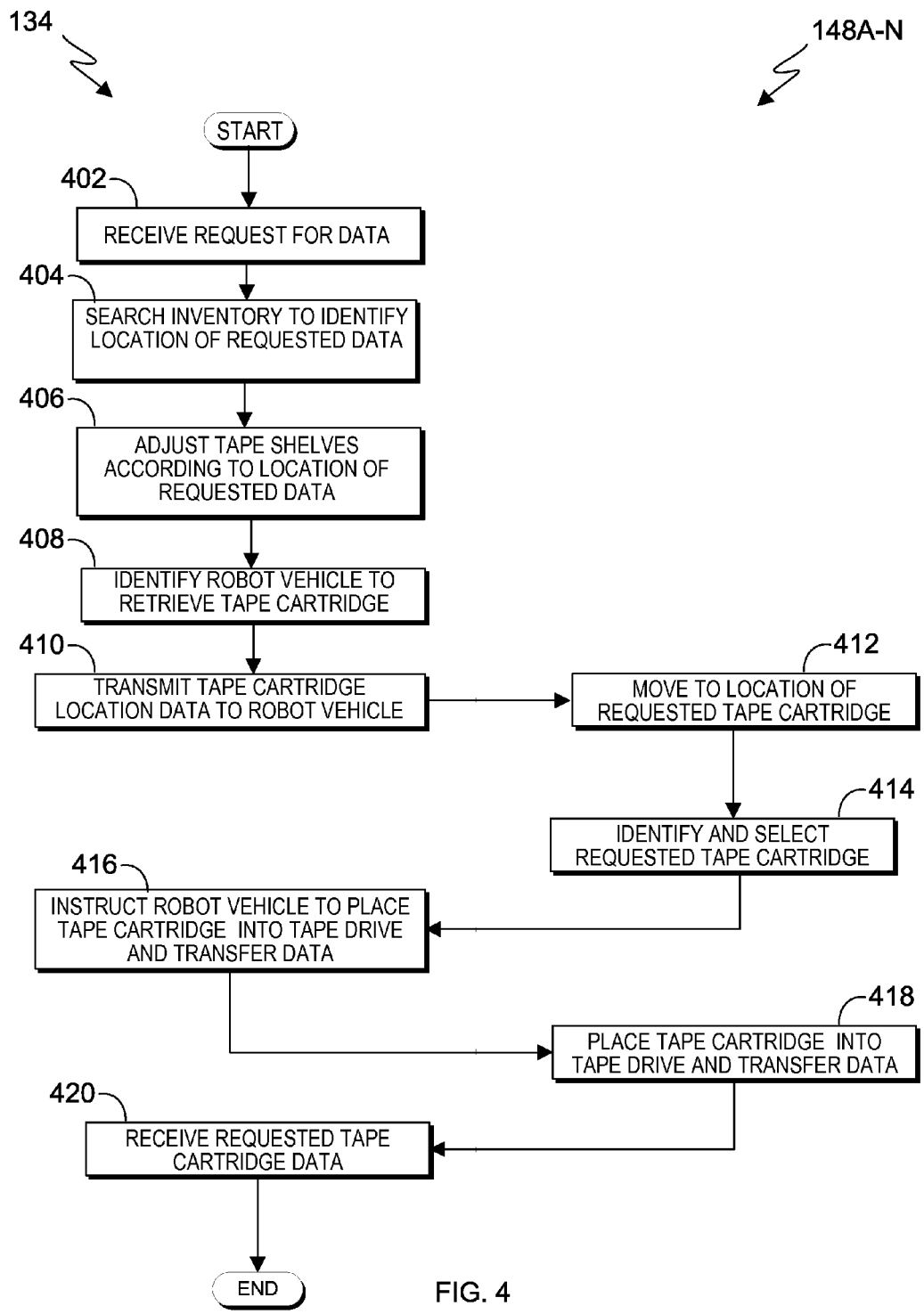
FIG. 4 is a flowchart depicting operational steps for fulfilling a data transfer request, in accordance with an embodiment of the present invention.

FIG. 4 is a flowchart depicting operational steps that library managing program 134 and robot vehicle control units 148A-N perform during a data transfer request, in accordance with an embodiment of the present invention. For illustrative purposes, the following discussion is made with respect to robot vehicle control unit 148A; it being understood that the operational steps of FIG. 4 may be performed by any of robot vehicle control units 148A-N.

In step 402, library managing program 134 receives a request for data stored on a tape cartridge. In this exemplary embodiment, library managing program 134 receives a request for a read or write of data from external host 120, via network 110.

In step 404, library managing program 134 searches a tape cartridge inventory in order to identify the location within the datacenter of the requested data. In this exemplary embodiment, library managing program 134 accesses and searches tape cartridge database 132 to determine a tape shelf location of the tape cartridge containing the requested data within datacenter 140.

In step 406, library managing program 134 adjusts one or more tape shelves according to the determined location of the requested tape cartridge. In this exemplary embodiment, library managing program 134 controls the movement of each of tape shelves 142A-N within datacenter 140, so that tape shelves which are not in use are moved close together to save floor space, and the necessary tape shelves are moved apart to generate an alley for a robot vehicle to retrieve a tape cartridge, when the tape cartridge is requested.

In step 408, library managing program 134 identifies a robot vehicle within the datacenter to retrieve the requested tape cartridge. In this exemplary embodiment, library managing program 134 optimizes the movement of robot vehicles 146A-N within datacenter 140, by choosing a robot vehicle which minimizes the time taken to complete a data transfer request (e.g., determining the robot vehicle which is closest to the requested tape cartridge and available to perform a data transfer). In other embodiments, library managing program 134 designates one or more robot vehicles 146A-N to manage certain requests. For example, library managing program 134 may designate three robot vehicles to manage data transfers of one tape shelf with a higher data request volume, and may designate one robot vehicle to manage data transfers of a second tape shelf with a lower data request volume.

In step 410, library managing program 134 transmits the tape cartridge location data to robot vehicle control unit 148A. In this exemplary embodiment, library managing program 134 accesses tape cartridge database 132 and determines the location data of the requested tape cartridge within the datacenter, and sends the location data to robot vehicle control unit 148A. The location data may include, for example, tape cartridge barcodes, tape cartridge radio frequency IDs, X, Y position of a robot vehicle, and X, Y, Z position of a robot arm and/or robot gripper, among other location data.

In step 412, robot vehicle control unit 148A receives the tape cartridge location data and moves to the location of the requested tape cartridge. In this exemplary embodiment, receiving tape cartridge location data from library managing program 134 is an indication to robot vehicle control unit 148A to move to the received location. Robot vehicle control unit 148A communicates with the robot vehicle motor to receive traveled distance feedback, in order to determine the distance and direction of the location coordinates associated with the requested tape cartridge. In this exemplary embodiment, the location at which a robot vehicle should be positioned in order to retrieve a requested tape cartridge is received by robot vehicle control unit 148A in the form of X, Y coordinate data. The X, Y coordinates associated with each tape cartridge are based on previous feedback data and stored in tape inventory database 132.

In step 414, robot vehicle control unit 148A identifies and selects the requested tape cartridge from the tape shelf. In this exemplary embodiment, each tape cartridge within the tape shelves of the datacenter contains a cartridge memory radio frequency identification (RFID) chip identifying the contents of the tape cartridge. Robot vehicle control unit 148A uses RFID to determine the tape cartridge containing the requested data from the tape library shelf. In other embodiments, robot vehicle control unit 148A scans a barcode identification located on the tape cartridge to determine the requested tape cartridge from the tape library shelf. In another embodiment, robot vehicle control unit 148A uses an image and/or video input from a camera feed to identify the requested tape cartridge from a tape library shelf. In yet another embodiment, robot vehicle control unit 148A uses one or more of RFID, barcode identification, and a camera feed, depending on the different technologies of the requested tape cartridges. For example, magnetic tape cartridges may be identified by scanning an RFID chip within the tape cartridge, while other tape cartridge technologies may be identified by robot vehicle control unit 148A by scanning a barcode located on the tape cartridge. In this exemplary embodiment, robot vehicle control unit 148A instructs the robot gripper to pick up the identified requested tape cartridge from the tape shelf.

In step 416, library managing program 134 instructs the robot vehicle to place the selected tape cartridge into a tape drive of the robot vehicle, and transfer the requested data contained on the tape cartridge. In this exemplary embodiment, library managing program 134 accesses tape cartridge database 132 and determines the X, Y, Z coordinate position data of the robot arm and/or gripper required to place the selected tape cartridge into a tape drive on the robot vehicle. Library managing program 134 instructs the control unit of the robot vehicle to initiate the read/write of the requested data to/from the selected tape cartridge.

In step 418, robot vehicle control unit 148A receives the instructions and coordinate position data, places the selected tape cartridge into a tape drive on the robot vehicle, and transfers the requested data from the tape cartridge. In this exemplary embodiment, robot vehicle control unit 148A communicates with a navigation sensor in the robot arm and/or robot gripper, to receive feedback signals via impulse counters in order to determine the distance and direction of the location coordinates associated with placing the tape cartridge into a tape drive on the robot vehicle. For example, each feedback signal may contain X, Y, and Z coordinate data representing the distance traveled in the X, Y, and Z directions. In this exemplary embodiment, the X, Y, and Z coordinates associated with a tape drive on each robot vehicle are based on previous feedback data and stored in tape inventory database 132. In other embodiments, each robot vehicle maintains an internal storage database in which the X, Y, and Z coordinates for each tape cartridge are stored and updated, allowing each robot vehicle to pick up and place a requested tape cartridge to and from any tape shelf.

Robot vehicle control unit 148A initiates the transfer of the requested data from the tape cartridge, after the tape cartridge has been place in the tape drive on the robot vehicle. In this exemplary embodiment, optical communication channels are used to establish a wireless network connection between the tape drive(s) in use and the computers located on the robot vehicle, to initiate a data transfer using a light source and light modulation technologies (described further in FIG. 6). In another embodiment, robot vehicle control unit 148A communicates with the robot arm and robot gripper of the vehicle to connect a plugging wire or fibre channel connection from a power connector on the robot vehicle to a dedicated plug-in within a datacenter. In other embodiments, the robot vehicle connects to a stationary optical or electrical docking station within a datacenter to establish a wired connection between the tape drive(s) in use and the computers located on the robot vehicle to initiate a data transfer. In yet another embodiment, a wireless network communication is used for data transfer, using radio frequencies to establish a wireless local area network (WLAN) communication between the tape drive(s) in use and the computers located on the robot vehicle.

In step 420, library managing program 134 receives the tape cartridge data and sends the data to the requesting external host. In some embodiments, the requesting external host receives disordered sets of data via various communication channels (i.e., some data transferred from robot vehicle and some data transferred from tape drive of tape shelf) and places the sets of data in the correct order via a software application.

Figure 5:
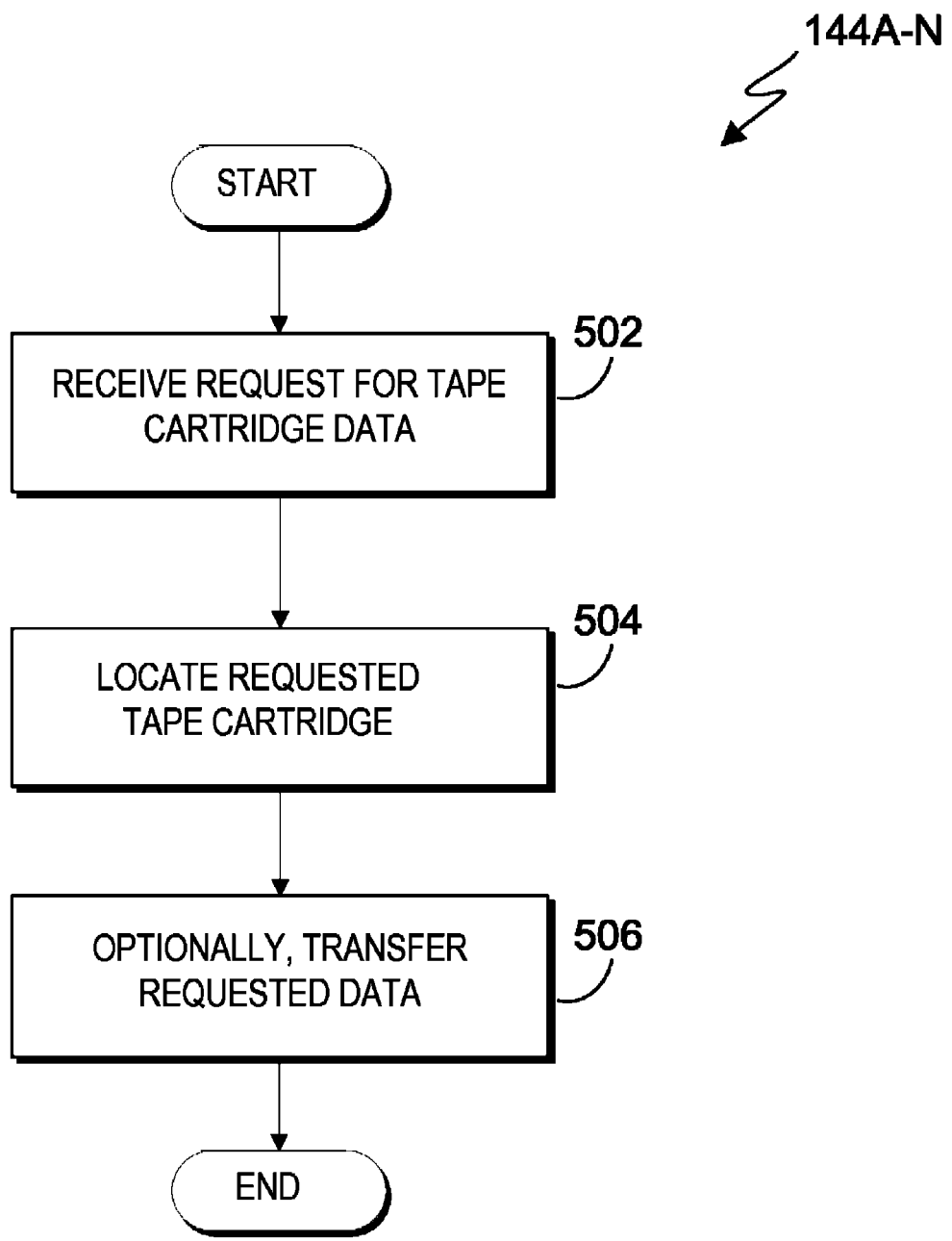
FIG. 5 is a flowchart depicting operational steps for fulfilling a data transfer request, in accordance with another embodiment of the present invention.

FIG. 5 is a flowchart depicting operational steps for performing a data transfer request by tape shelf control units 144A-N, in accordance with another embodiment of the present invention. For illustrative purposes, the following discussion is made with respect to tape shelf control unit 144A; it being understood that the operational steps of FIG. 5 may be performed by any of tape shelf control units 144A-N.

In step 502, tape shelf control unit 144A receives a request for tape cartridge data from external host 120 via a datacenter control program, such as library managing program 134.

In step 504, tape shelf control unit 144A locates the tape cartridge containing the requested data. In this exemplary embodiment, each tape shelf contains an individual database storing the location information for each tape cartridge on the tape shelf. Tape shelf control unit 144A accesses the database and determines which tape shelf within the datacenter contains the tape cartridge with the requested data. In this exemplary embodiment, tape shelf control unit 144A controls the movement of an electromechanical front-mounted X, Y accessor, which is able to move in the vertical and horizontal directions, in order to pick up a requested tape cartridge. In other embodiments, tape shelf control unit 144A instructs the tape shelves within the datacenter to move in one of two directions, in order to create an access alley for a robot vehicle to the tape shelf of the requested tape cartridge.

In step 506, tape shelf control unit 144A optionally transfers the requested data from the tape cartridge to a requesting host. In this exemplary embodiment, tape shelf control unit 144A initiates the transfer of data from a tape drive module in the tape shelf, which contains a computer and wireless communication, to a requesting host via a datacenter control program, such as library managing program 134. In another embodiment, tape shelf control unit 144A communicates with the control units of each robot vehicle in order to optimize data transfer requests within a datacenter. For example, one tape drive module in a tape shelf may be designated to perform complex back-up requests, while a second tape drive module on a robot vehicle may be designated to perform simple read/write requests to an external host. In other embodiments, each tape shelf within a datacenter contains only tape cartridge slots without added tape drive modules, and the read/write requests for data from external hosts are handled solely by the tape drive modules of the robot vehicles.

Figure 6:
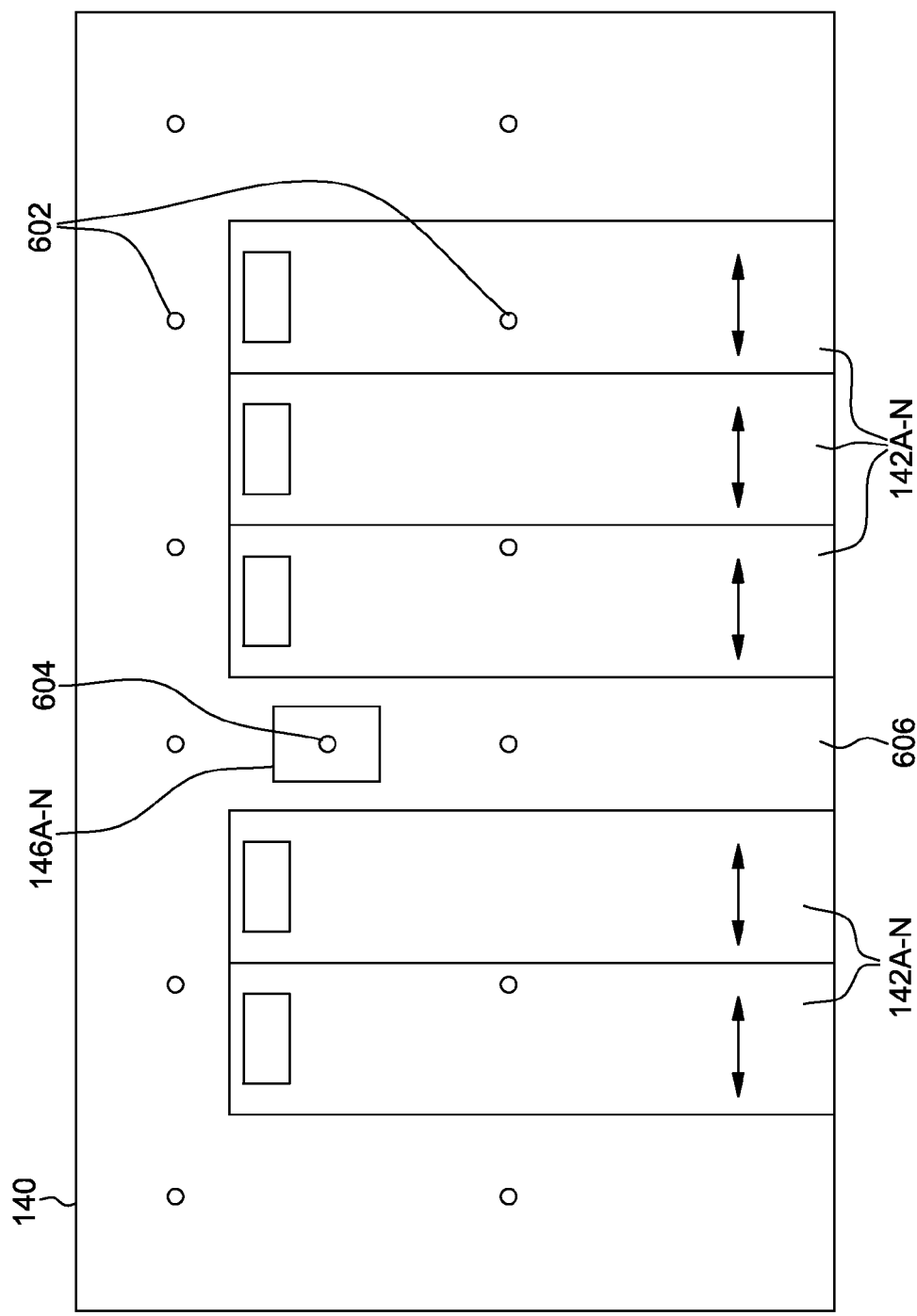
FIG. 6 depicts an example plan view of a datacenter in which light link channels are used for data transmission, in accordance with an embodiment of the present invention.

FIG. 6 depicts an example plan view of a hypothetical datacenter 140 in which light link channels are used for data transmission, in accordance with an embodiment of the present invention. Datacenter 140 includes moveable tape shelves 142A-N. Moveable tape shelves 142A-N are each a single tape shelf capable of moving in two different directions, as indicated by the directional arrows in FIG. 6, and may be stacked close together to make an alley, such as alley 606, for one or more robot vehicles 146A-N within datacenter 140. Robot vehicles 146A-N are autonomous android vehicles capable of moving around the floor of datacenter 140 and moving between tape shelves 142A-N. Each of robot vehicles 146A-N contains light link receiver 604, which receives light from light link channels 602, to establish an Internet connection via light waves (i.e., "Li-Fi"). Light link channels 602 are each a source of light, for example, an LED bulb, and are in various locations throughout datacenter 140. In this exemplary embodiment, light link channels 602 are each specialized LED bulbs capable of generating a wireless connection using light, located in the ceiling of datacenter 140. Light link receiver 604 is capable of receiving a data transmission from light link channels 602 within a certain distance range. In this exemplary embodiment, light link receiver 604 may receive data when located within a 50 meter range of at least one of light link channels 602.

Figure 7:
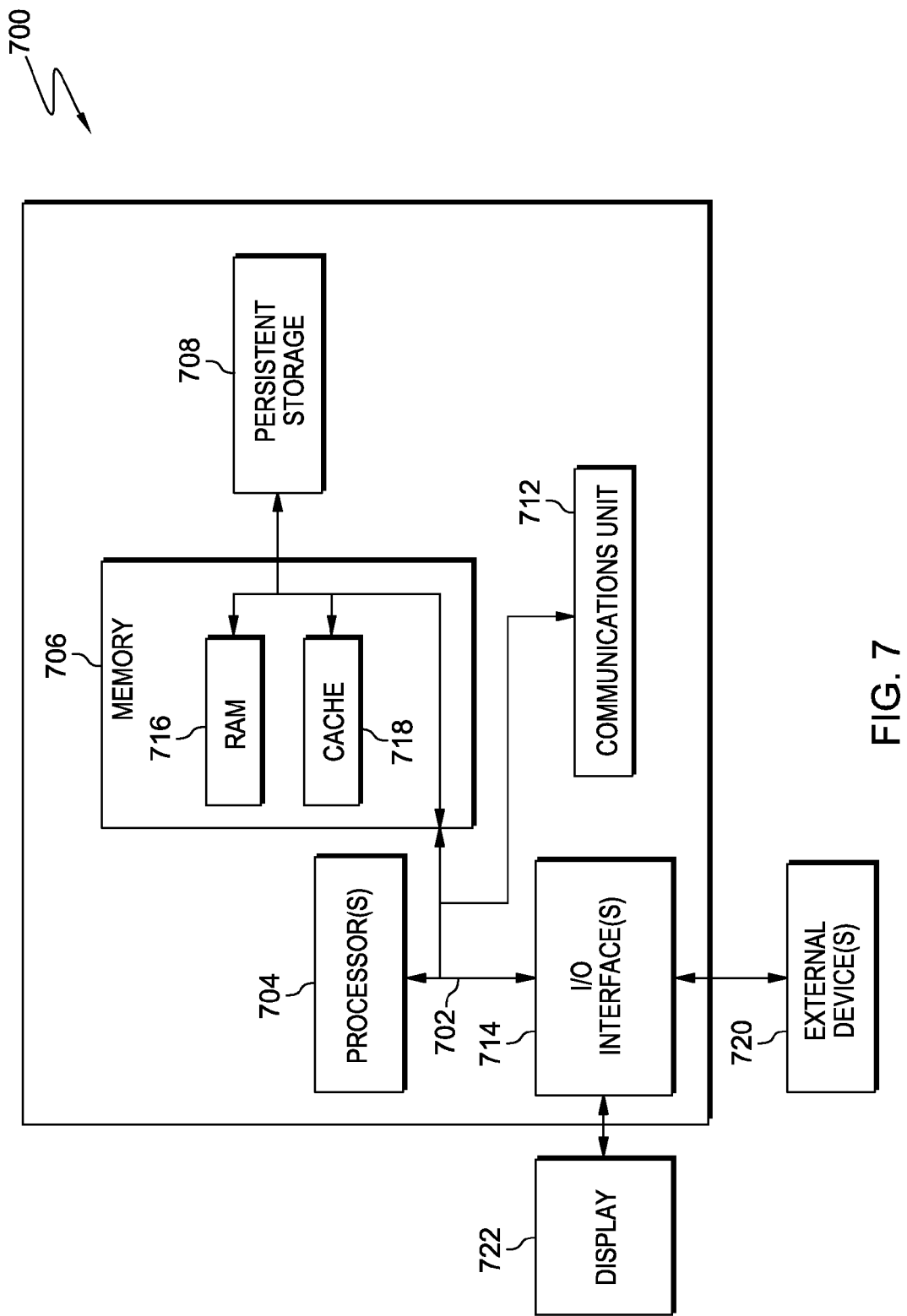
FIG. 7 depicts a block diagram of internal and external components of a data processing system, such as the external host of FIG. 1, in accordance with an embodiment of the present invention.

FIG. 7 depicts a block diagram of components of external host 120 and library management server 130, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

External host 120 and library management server 130 each include communications fabric 702, which provides communications between computer processor(s) 704, memory 706, persistent storage 708, communications unit 712, and input/output (I/O) interface(s) 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In this embodiment, memory 706 includes random access memory (RAM) 716 and cache memory 718. In general, memory 706 can include any suitable volatile or non-volatile computer readable storage media.

The programs tape cartridge database 132 and library managing program 134 in library management server 130 are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 712, in these examples, provides for communications with other data processing systems or devices, including between external host 120 and library management server 130. In these examples, communications unit 712 includes one or more network interface cards. Communications unit 712 may provide communications through the use of either or both physical and wireless communications links. The programs tape cartridge database 132 and library managing program 134 in library management server 130 may be downloaded to persistent storage 708 through communications unit 712.

I/O interface(s) 714 allows for input and output of data with other devices that may be connected to external host 120 and library management server 130. For example, I/O interface 714 may provide a connection to external devices 720, such as a keyboard, keypad, a touch screen, and/or some other suitable input device. External devices 720 can also include portable computer readable storage media such as, for example, thumb drives, portable optical or magnetic disks, and memory cards. Software and data used to practice embodiments of the present invention, e.g., the programs tape cartridge database 132 and library managing program 134 in library management server 130, can be stored on such portable computer readable storage media and can be loaded onto persistent storage 708 via I/O interface(s) 714. I/O interface(s) 714 also connect to a display 722.

Display 722 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A tape shelf module comprising:
   a chassis, the chassis having a plurality of tape cartridge slots for storing one or more tape cartridges;
   at least one tape drive module physically coupled to the chassis, wherein the at least one tape drive module is configured to read tape cartridge data from the one or more tape cartridges;
   a control unit operatively coupled to the chassis, the control unit configured to manage an inventory of the one or more tape cartridges; and
   at least one moving device physically coupled to the bottom of the chassis, the at least one moving device being operatively connected to the control unit to move the entirety of the chassis in at least two directions, according to instructions received from the control unit.

2. The tape shelf module of claim 1, wherein the control unit and the at least one moving device are configured to move the chassis to create an access alley for a robot vehicle to move between the chassis and a second chassis of a second tape shelf module, wherein:
   the robot vehicle is external to the chassis and the second chassis; and
   the robot vehicle is configured to move independently from the chassis and the second chassis.

3. The tape shelf module of claim 1, wherein each of the at least one tape drive module comprises:
   a computer; and
   a communication device, wherein the communication device is configured to wirelessly transfer tape cartridge data directly to a host.

4. The tape shelf module of claim 3, wherein each communication device of the at least one tape drive module is configured to manage an independent wireless connection for transferring tape cartridge data directly to a host.

5. The tape shelf module of claim 1, wherein the control unit is configured to communicate with one or more robot vehicles, the one or more robot vehicles being external and uncoupled to the tape shelf module.

6. The tape shelf module of claim 5, wherein the control unit is configured to instruct the at least one tape drive module coupled to the chassis to manage a request for data when the one or more external robot vehicles are not free to manage a request for data.

7. The tape shelf module of claim 1, wherein the control unit of the chassis is configured to communicate with at least a second chassis of a second tape shelf module.

8. A tape shelf module comprising:
   a chassis, the chassis having a plurality of tape cartridge slots for storing at least two different data storage technologies;
   a control unit operatively coupled to the chassis, the control unit configured to manage an inventory of the one or more tape cartridges; and
   at least one moving device physically coupled to the bottom of the chassis, the at least one moving device being operatively connected to the control unit to move the entirety of the chassis in at least two directions, according to instructions received from the control unit.

9. The tape shelf module of claim 8, wherein the control unit and the at least one moving device are configured to move the chassis to create an access alley for a robot vehicle to move between the chassis and a second chassis of a second tape shelf module, wherein:
   the robot vehicle is external to the chassis and the second chassis; and
   the robot vehicle is configured to move independently from the chassis and the second chassis.

10. The tape shelf module of claim 8, wherein the control unit is configured to communicate with one or more robot vehicles, the one or more robot vehicles being external and uncoupled to the tape shelf module.

11. The tape shelf module of claim 8, wherein the control unit of the chassis is configured to communicate with at least a second chassis of a second tape shelf module.

12. A tape shelf module comprising:
    a chassis, the chassis having a plurality of tape cartridge slots for storing one or more tape cartridges;
    at least one tape drive module physically coupled to the chassis, wherein the at least one tape drive module is configured to read tape cartridge data from the one or more tape cartridges;
    a control unit operatively coupled to the chassis, the control unit configured to manage an inventory of the one or more tape cartridges;
    at least one moving device physically coupled to the bottom of the chassis, the at least one moving device being operatively connected to the control unit to move the entirety of the chassis in at least two directions, according to instructions received from the control unit; and
    an accessor physically coupled to the chassis, the accessor operatively connected to the control unit to pick up and place tape cartridges to the at least one tape drive module physically coupled to the chassis, according to instructions received from the control unit.

13. The tape shelf module of claim 12, further comprising a cover removably coupled to the chassis, enclosing the accessor within the chassis, wherein the one or more tape cartridges are accessible by an external robot vehicle when the cover is removed.

14. The tape shelf module of claim 12, wherein the control unit and the at least one moving device are configured to move the chassis to create an access alley for a robot vehicle to move between the chassis and a second chassis of a second tape shelf module, wherein:
    the robot vehicle is external to the chassis and the second chassis; and
    the robot vehicle is configured to move independently from the chassis and the second chassis.

15. The tape shelf module of claim 12, wherein the control unit is configured to communicate with one or more robot vehicles, the one or more robot vehicles being external and uncoupled to the tape shelf module.

16. The tape shelf module of claim 15, wherein the control unit is configured to instruct the at least one tape drive module coupled to the chassis to manage a request for data when the one or more external robot vehicles are not free to manage a request for data.

17. The tape shelf module of claim 12, wherein each of the at least one tape drive module comprises:
    a computer; and
    a communication device, wherein the communication device is configured to wirelessly transfer tape cartridge data directly to a host.

18. The tape shelf module of claim 17, wherein each communication device of the at least one tape drive module is configured to manage an independent wireless connection for transferring tape cartridge data directly to a host.

19. The tape shelf module of claim 12, wherein the control unit of the chassis is configured to communicate with at least a second chassis of a second tape shelf module.

20. The tape shelf module of claim 14, wherein:
the second chassis of the second tape shelf module is configured to move independently from the chassis of the tape shelf module;
the second chassis of the second tape shelf module is configured to manage a request for tape cartridge data independently from the chassis of the tape shelf module; and
the second chassis of the second tape shelf module is configured to transfer tape cartridge data independently from the chassis of the tape shelf module.

* * * * *